(12) United States Patent
Gilbert et al.

(10) Patent No.: US 7,178,787 B2
(45) Date of Patent: Feb. 20, 2007

(54) VALVE ASSEMBLY

(75) Inventors: Wendell L. Gilbert, Lebanon, TN (US); Michael A. MacMillan, Nashville, TN (US)

(73) Assignee: TRW Automotive U.S. LLC, Livonia, MI (US)

( * ) Notice: Subject to any disclaimer, the term of this patent is extended or adjusted under 35 U.S.C. 154(b) by 0 days.

(21) Appl. No.: 11/122,546

(22) Filed: May 5, 2005

(65) Prior Publication Data

US 2006/0249703 A1 Nov. 9, 2006

(51) Int. Cl.
*F16K 17/04* (2006.01)
(52) U.S. Cl. ...................................... 251/337
(58) Field of Classification Search ............... 251/337
See application file for complete search history.

(56) References Cited

U.S. PATENT DOCUMENTS

| | | | | |
|---|---|---|---|---|
| 1,251,003 A * | 12/1917 | Fornaca | ...................... | 251/322 |
| 2,393,589 A | 1/1946 | Compton et al. | | |
| 2,682,386 A * | 6/1954 | Lindsay | ...................... | 251/74 |
| 3,782,412 A | 1/1974 | Darash | | |
| 4,016,903 A | 4/1977 | Akashi et al. | | |
| 4,062,375 A * | 12/1977 | Byrnes | ...................... | 137/296 |
| 4,300,591 A * | 11/1981 | Sutton | ...................... | 137/493.4 |
| 4,938,418 A * | 7/1990 | Halvorsen | ...................... | 239/5 |
| 4,948,092 A | 8/1990 | Kasper et al. | | |
| 5,000,222 A | 3/1991 | Moenkhaus et al. | | |
| 5,058,961 A | 10/1991 | Mergenthaler et al. | | |
| 5,412,948 A | 5/1995 | Komura et al. | | |
| 5,632,467 A | 5/1997 | Just et al. | | |
| 5,687,468 A | 11/1997 | Hans et al. | | |
| 5,758,626 A * | 6/1998 | Maley | ...................... | 123/506 |
| 6,045,116 A | 4/2000 | Willke et al. | | |
| 6,073,444 A | 6/2000 | Horton et al. | | |
| 6,082,315 A * | 7/2000 | Schneider | ...................... | 123/90.11 |
| 6,307,286 B1 * | 10/2001 | Yamazaki et al. | ...................... | 310/26 |
| 6,406,272 B2 | 6/2002 | Ruthardt et al. | | |
| 6,761,182 B1 | 7/2004 | Trimble et al. | | |

* cited by examiner

*Primary Examiner*—Justine R. Yu
*Assistant Examiner*—Andrew J. Rost
(74) *Attorney, Agent, or Firm*—Tarolli, Sundheim, Covell & Tummino LLP

(57) ABSTRACT

An improved valve assembly (100) includes a primary spring (142) which extends along a valve stem (144). A spring retainer (150) holds the primary spring (142) on the valve stem (144) and has a thread convolution (152) which engages a thread convolution (154) on the valve stem (144). The spring retainer (150) has a force transmitting surface (182) which engages a reference surface (184) on the valve stem (144) with a retainer preload force which is at least as great as a primary spring preload force. Shims (158–162) are provided between the primary spring (142) and the spring retainer (150) to enable a desired primary spring preload force to be obtained.

2 Claims, 2 Drawing Sheets

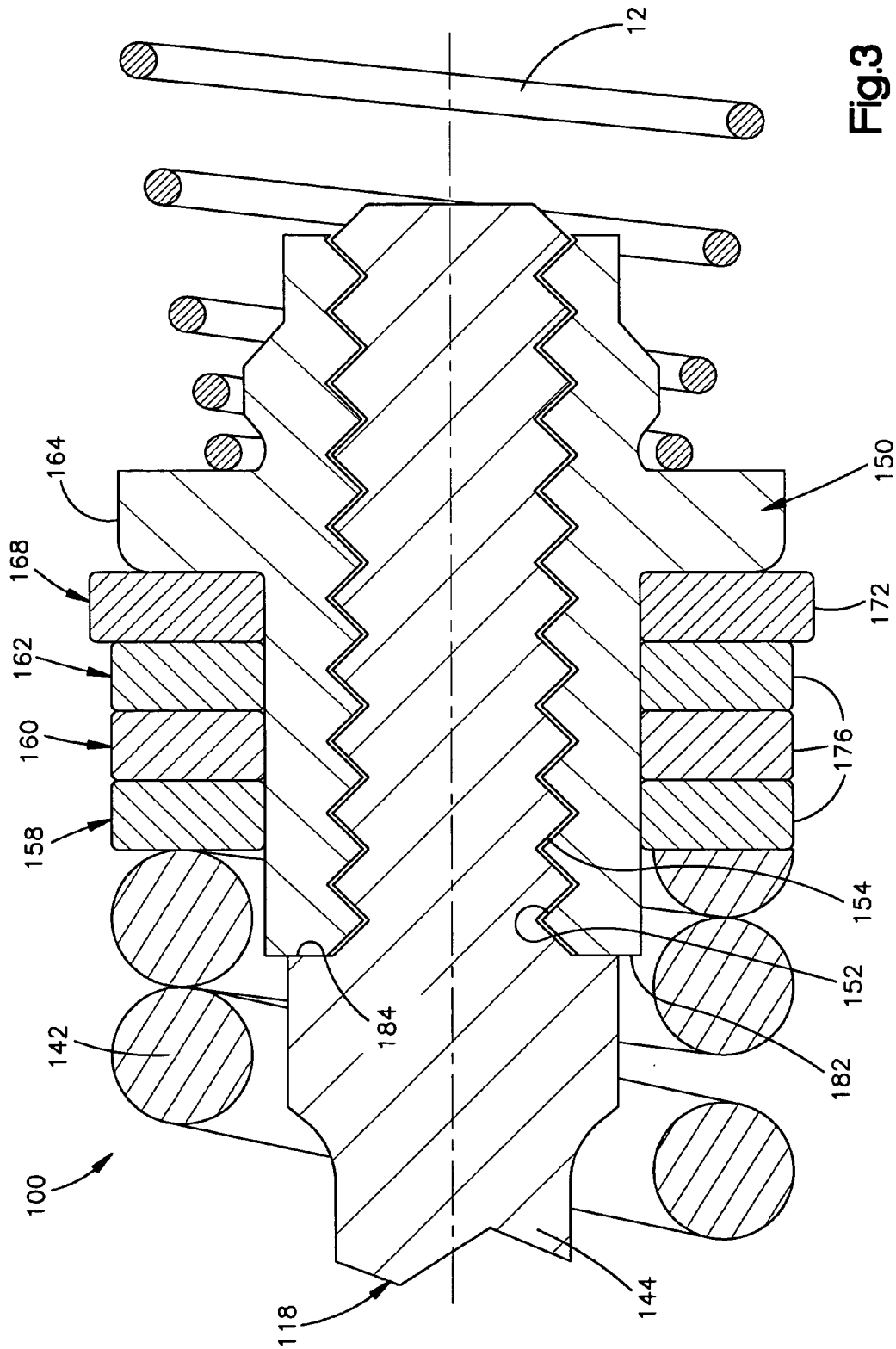

VALVE ASSEMBLY

BACKGROUND OF THE INVENTION

The present invention relates to a new and improved valve assembly which functions as a pressure limiting valve.

A known valve assembly 10 is illustrated in FIG. 1 of the drawings and is utilized in a hydraulic power steering system as a pressure limiting valve. The valve assembly 10 also functions as a reverse flow check valve.

The known valve assembly 10 of FIG. 1 is enclosed in a housing 12 having a main section 14 and a cap 16. The valve assembly 10 is disposed in a valve cavity 20 having an inlet passage 22 and an outlet cavity or passage 24. The valve assembly 10 includes a valve member 28 having a head end portion 30.

A valve seat 32 is pressed against a sealing surface 34 on the housing 12 by a preload spring 36. A primary spring 40 extends around a valve stem 42. The primary spring 40 presses the valve seat 32 against the head end portion 30 of the valve member 28.

An external thread convolution 44 (FIG. 1) on the valve stem 42 is engaged by a spring retainer 46. The spring retainer 46 holds the primary spring 40 and a damping disk 48 on the valve stem 42.

When the known valve assembly 10 is being assembled, an internal thread convolution 52 on the spring retainer 46 is moved into engagement with the external thread convolution 44 on the valve stem 42. The spring retainer 46 is rotated relative to the valve stem 42 to compress the primary spring 40 against the valve seat 32 and head end portion 30 of the valve member 28. When the spring retainer 46 has been moved toward the left (as viewed in FIG. 1) to a desired position relative to the valve stem 42, the spring retainer is fixedly connected to the valve stem by a weld 56.

Valve assemblies having the same general construction as the valve assembly 10 of FIG. 1 have previously been utilized in many different types of hydraulic systems. Difficulty is encountered in manufacturing a quantity of the valve assemblies 10 having the same characteristics. This is because the preload on the primary spring 40 may be different in different valve assemblies.

In addition, when the weld 56 is formed between the spring retainer 46 and valve stem 42, there may be a tendency for the position of the spring retainer 46 to change relative to the head end portion 30 of the valve member 28 with a resulting change in the preload on the primary spring 40. If a valve assembly 10 does not have the desired characteristics, the weld 56 makes it impractical to adjust the valve assembly to have the desired characteristics. This can result in the scrapping of valve assemblies during production with a resulting increase in production costs.

SUMMARY OF THE INVENTION

A valve assembly constructed in accordance with the present invention includes a valve seat which is disposed in engagement with a head end portion of a valve member. A spring retainer has a thread convolution which engages a thread convolution on a valve stem. A primary spring is compressed between the valve seat and the spring retainer to provide a spring preload force which presses the valve seat against the head end portion against the valve member. The thread convolution on the spring retainer and the thread convolution on the valve stem press a force transmitting surface on the spring retainer against a reference surface on the valve stem with a retainer preload force which is at least as great as a primary spring preload force.

A plurality of shims may advantageously be disposed between the primary spring and the spring retainer. In addition, a damping disk may be provided between the primary spring and the spring retainer. The damping disk may have a circular outer side surface which cooperates with a housing to dampen movement of the valve member relative to the housing.

It should be understood that a valve assembly constructed in accordance with the present invention has a plurality of features. These features may be utilized together as disclosed herein. Alternatively, these features may be used separately or in different combinations with features from the prior art.

BRIEF DESCRIPTION OF THE DRAWINGS

The foregoing and other features of the present invention will become apparent to one skilled in the art to which the present invention relates upon consideration of the following description of the invention with reference to the accompanying drawings, in which:

FIG. 3 is an enlarged fragmentary sectional view of a portion of the valve assembly of FIG. 2.

DESCRIPTION OF A SPECIFIC PREFERRED EMBODIMENT OF THE INVENTION

Figure 2:
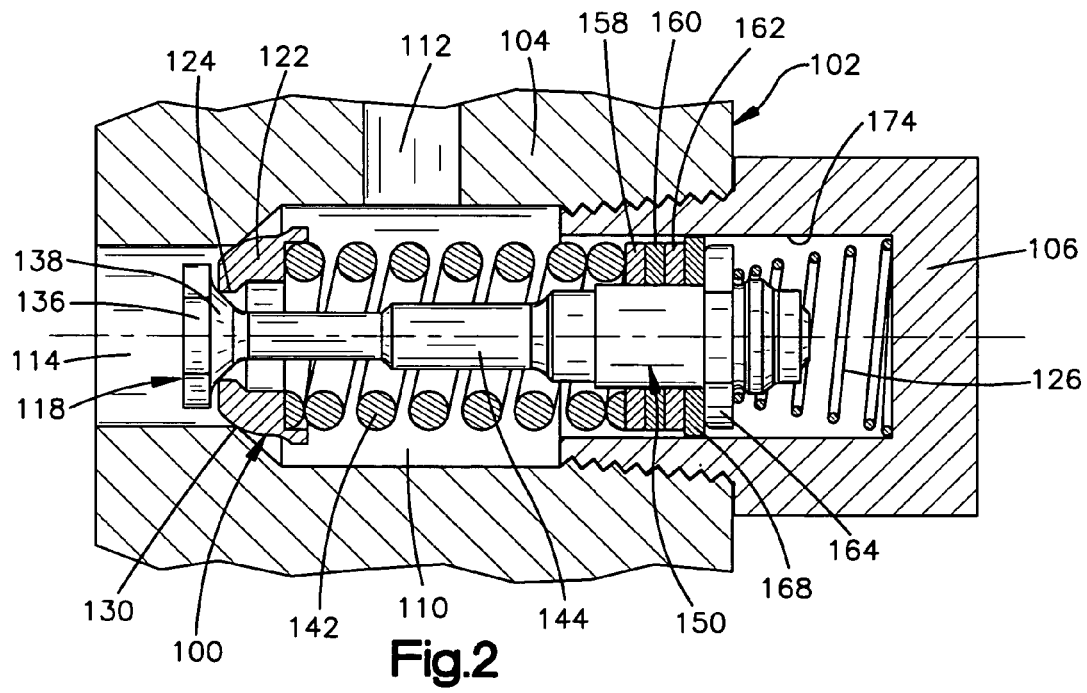
FIG. 2 is a sectional view, generally similar to FIG. 1, of a valve assembly constructed in accordance with the present invention.

A valve assembly 100 constructed in accordance with the present invention is illustrated in FIG. 2 in a housing 102. The metal housing 102 includes a main section 104 and a cap 106. The housing 102 contains a generally cylindrical valve cavity 110 in which the valve assembly 100 is disposed. An inlet passage 112 is connected in fluid communication with the valve cavity 110. The valve assembly 100 controls fluid flow from the valve cavity 110 to an outlet cavity or passage 114.

The valve assembly 100 maintains a constant stable pressure in the valve cavity 110 and functions as a reverse flow check valve. When the fluid pressure in the valve cavity 110 exceeds the fluid pressure in the outlet passage or cavity 114 by a predetermined amount, a valve member 118 moves toward the left (as viewed in FIG. 2) relative to a valve seat 122. This allows fluid to flow from the valve cavity 110 through a circular port 124 in the annular valve seat 122 to maintain a predetermined fluid differential between the valve cavity 110 and the outlet passage or cavity 114.

If the fluid pressure in the outlet passage or cavity 114 exceeds the fluid pressure in the valve cavity 110 by more than a predetermined amount, the relatively high fluid pressure in the outlet passage or cavity 114 moves the valve seat 122 and the valve member 118 toward the right (as viewed in FIG. 2) against the influence of the preload spring 126. This moves the annular metal valve seat 122 out of sealing engagement with a circular sealing surface 130 formed on the main section 104 of the housing 102 at a location between the outlet passage or cavity 114 and valve cavity 110. Although the illustrated sealing surface 130 is formed by a circular corner disposed between the valve cavity 110 and outlet passage or cavity 114, the sealing surface 130 may be formed by an arcuate surface having a configuration which corresponds to the configuration of an outer side surface of the valve seat 122.

It is believed that the valve assembly 110 will be utilized in many different types of hydraulic systems. As an example, the valve assembly 100 may be utilized in a power steering system. As another example, the valve assembly 100 may be utilized in association with auxiliary equipment. As still a further example, the valve assembly 100 may be utilized in association with a hydraulic braking system. Of course, a valve assembly having the same general construction as the valve assembly 100 may be utilized with a gas operated system rather than a hydraulic system.

The one piece metal valve member 118 includes a head end portion 136 having a sealing surface 138 with a generally conical configuration. The sealing surface 138 engages the circular port 124 in the valve seat 122 to form a fluid tight seal. The seal between the valve seat 122 and valve member 118 prevents fluid flow from the valve cavity 110 to the outlet passage or cavity 114 when the valve member 118 is in the closed position of FIG. 2.

When the fluid pressure in the valve cavity 110 exceeds the fluid pressure in the outlet passage or cavity 114 by a predetermined amount, the valve member 118 is axially moved toward the left (as viewed in FIG. 2) relative to the valve seat 122. This operates the valve member 118 from the closed condition of FIG. 2 to an open condition in which fluid can flow through the port 124 in the valve seat 122. As the fluid flows through the port 124, the momentum of the fluid flow is applied against the conical sealing surface 138 and adds to the fluid pressure force on the valve member 118. As this occurs, the size of an annular gap between the sealing surface 138 on the valve seat 122 and the port 124 increases so that the pressure difference between the valve cavity 110 and outlet passage or cavity 114 remains constant with increasing fluid flow.

A primary spring 142 extends around and is coaxial with a valve stem 144. The generally cylindrical valve stem 144 extends axially from the head end portion 136 of the valve member 118. The valve stem 144 is disposed in a coaxial relationship with the head end portion 136 of the valve member 118 and with the valve seat 122. The primary spring 142 is a metal helical coil spring. However, the primary spring 142 may have a different configuration if desired.

The preload spring 126 is substantially weaker than the primary spring 142. This enables the preload force in the primary spring 142 to be substantially greater than the preload force in the preload spring 126. Therefore, the sealing surface 138 on the valve member 118 moves away from the valve seat 122 to open the port 124 when the fluid pressure in the valve cavity 110 exceeds the fluid pressure in the outlet passage or cavity 114 by a relatively large amount. However, the valve seat 122 moves away from the sealing surface 130 when the fluid pressure in the outlet passage or cavity 114 exceeds the fluid pressure in the valve cavity 110 by a relatively small amount.

The valve seat 122 and primary spring 142 are held on the valve member 118 by a spring retainer 150. The one piece metal spring retainer 150 has an internal thread convolution 152 (FIG. 3) which engages an external thread convolution 154 on the valve stem 144. The metal preload spring 126 engages the right (as viewed in FIG. 3) end portion of the spring retainer 150. The primary spring 142 and valve stem 144 are disposed in a coaxial relationship with the spring retainer 150.

In accordance with one of the features of the present invention a plurality of shims 158, 160 and 162 (FIG. 3) are disposed between a hexagonal flange 164 on the spring retainer 150 and the primary spring 142. By increasing or decreasing the number of annular metal shims 158–162, the extent to which the primary spring 142 is compressed can be adjusted. In addition, the extent of compression of the primary spring 142 can be adjusted by varying the thickness of the shims 158–162. Of course, both the number and thickness of the shims may be varied to obtain the desired extent of compression of the primary spring 142.

A damping disk 168 is provided between the stack of shims 158–162 and the flange 164 on the spring retainer 150. The annular damping disk 168 has a cylindrical outer side surface 172 which cooperates with a cylindrical inner side surface 174 (FIG. 2) on the cap 106 to dampen movement of the valve member 118 relative to the housing 102. During changes in the fluid pressure in the valve cavity 110, such as may occur during a pressure limiting operation, the damping disk 168 may oscillate relative to the cap 106. The clearance space between the cylindrical outer side surface 172 (FIG. 3) on the damping disk 168 and the inner side surface 174 of the cap 176 and tends to minimize any tendency for the valve member 118 to oscillate relative to the housing 102 with changes in pressure in the valve cavity 110.

The shims 158–162 have cylindrical outer side surfaces 176 which are disposed in a coaxial relationship with the cylindrical outer side surface 172 of the damping disk 168. The cylindrical outer side surfaces 176 of the shims 158–162 have a diameter which is smaller of the diameter of the cylindrical outer side surface 172 of the damping disk 168. This enables the size of the annular gap between the cylindrical outer side surface 172 on the damping disk 168 and the inner side surface 174 (FIG. 2) on the cap 106 to control oscillations of the valve member relative to the housing. Of course, the shims 158–162 (FIG. 3) may be sized so that their outer side surfaces 176 will cooperate with the inner side surface 172 (FIG. 2) of the cap 106 to retard oscillation of the valve member 118 relative to the housing 102.

In accordance with another feature of the present invention, the internal thread convolution 152 (FIG. 3) on the spring retainer 150 and the external thread convolution 154 on the valve stem 144 cooperate to press a force transmitting surface 182 on the spring retainer 150 against a reference surface 184 on the valve stem 144 with a retainer preload force which is at least as great as a preload force in the primary spring 142. Thus, the wrenching flats on the flange 164 (FIG. 3) of the spring retainer 150 are engaged by a torque wrench. Force is applied to the torque wrench to press the flat annular force transmitting surface 182 on the end of the spring retainer 150 against the flat annular reference surface 184 with a predetermined clamping force corresponding to the torque transmitted from the wrench to the spring retainer 150.

The clamping force which is transmitted from the surface 182 on the spring retainer 150 to the reference surface 184 on the valve stem 144 is effective to deflect the internal thread convolution 152 on the spring retainer and the external thread convolution 154 on the valve member 150. The clamping force transmitted between the coaxial annular surfaces 182 and 184 deflects the thread convolutions 152 and 154 to a greater extent than the preload force transmitted from the primary spring 142 through the shims 158–162 and damping disk 168 to the flange 164 on the spring retainer 150. Therefore, once the spring retainer 150 has been tightened to apply the predetermined clamping force against the reference surface 184, the internal and external thread convolutions 152 and 154 are not further deflected by transmittal of the preload force from the primary spring 142 to the spring retainer 150.

When the preload force in the primary spring 142 is to be adjusted, the number and and/or axial thickness of the shims 158–162 is adjusted. For example, if the preload force in the primary spring 142 is to be increased, the number of shims may be increased from the illustrated three shims of FIG. 3 to four shims. Alternatively, the thickness of one or more of the shims 158–162 may be increased. Regardless of how the preload force applied to the primary spring 142 is increased, the preload force in the primary spring 142 is less than the clamping force transmitted from the annular force transmitting surface 182 on the spring retainer 150 to the annular reference surface 184 on the valve member 118. The clamping force provided between the force transmitting surface 182 on the spring retainer 150 and the reference surface 184 on the valve member 118 eliminates welding of the spring retainer 150 to the valve stem 144.

During production of the valve assembly 100, the valve seat 122 (FIG. 2) is positioned on the valve member 118 in engagement with the sealing surface 138 on the head end portion 136 of the valve member. The primary spring 142 is then telescopically positioned around the valve stem 144 and moved into engagement with the valve seat 122. Contemporaneously therewith, the damping disk 168 and shims 158–162 are positioned on the spring retainer 150.

The internal thread convolution 152 (FIG. 3) in the spring retainer 150 is then moved into engagement with the external thread convolution 154 on the valve stem 144. The spring retainer 150 is then rotated relative to the valve member 118. Cooperation between the internal thread convolution 152 on the spring retainer 150 and the external thread convolution 154 on the valve stem 144 moves the spring retainer 150, damping disk 168 and shims 158–162 axially along the valve stem 144 until the shim 158 engages an end of the primary spring 142.

Continued rotation of the spring retainer 150 results in the primary spring 142 being compressed between the spring retainer 150 and the valve seat 122 (FIG. 2). As this occurs, the force transmitting surface 182 (FIG. 3) on the spring retainer 150 moves into engagement with the reference surface 184 on the valve stem 144. A predetermined torque is then applied to the spring retainer 150 to further rotate the spring retainer relative to the valve stem 144. As this occurs, the annular force transmitting surface 182 on the spring retainer 150 slides along the annular reference surface 184 on the valve member 118.

When the spring retainer 150 has been tightened with a predetermined torque, the force transmitting surface 182 is pressed against the reference surface 184 with a predetermined clamping force. At this time, the primary spring 142 will have been axially compressed to obtain a predetermined preload force in the primary spring. This preload force is transmitted from the primary spring 142 to the flange 164 on the spring retainer 150 and to the valve seat 122. The preload force in the primary spring 142 presses the valve seat 122 against the head end portion 136 of the valve member 118 to provide a fluid tight seal between the valve seat 122 and the head end portion 136 of the valve member 118.

Figure 1:
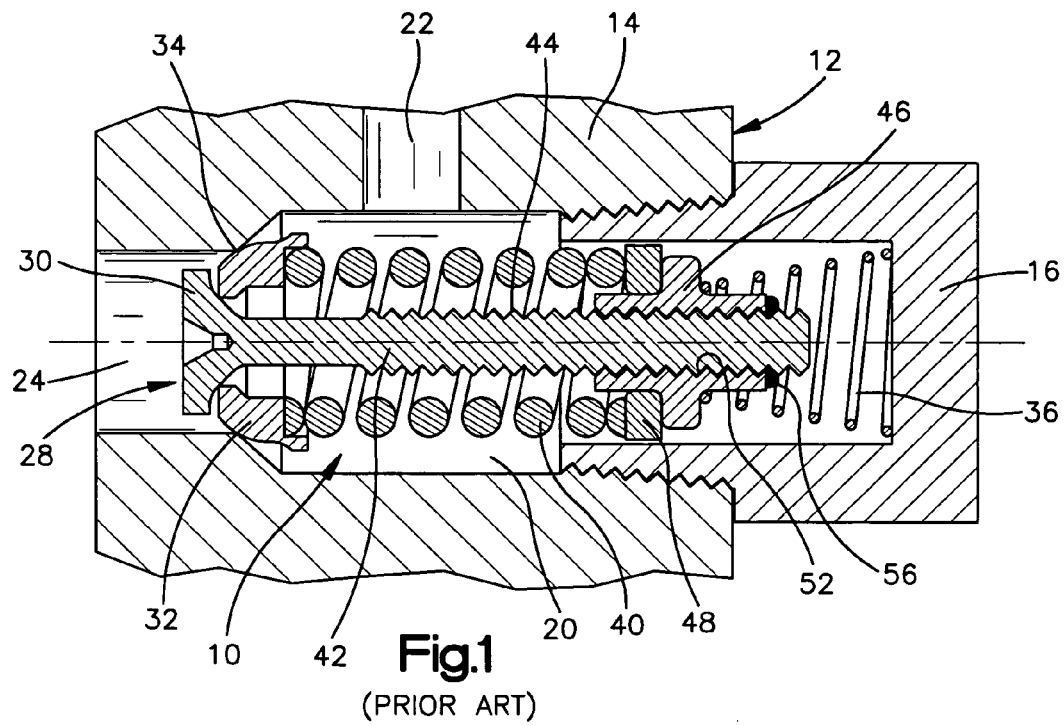
FIG. 1 is a sectional view of a known valve assembly.

The preload force transmitted from the primary spring 142 to the spring retainer 150 is less than the clamping force transmitted between the force transmitting surface 182 on the spring retainer 150 and the reference surface 184 on the valve member 118. The clamping force transmitted between the spring retainer 150 and valve member 118 is more than sufficient to prevent relative rotation between the spring retainer 150 and valve member 118 in a direction which would tend to loosen the spring retainer 150 on the valve member. Therefore, it is not necessary to weld the spring retainer 150 to the valve member 118 in the manner illustrated in association with the valve assembly of FIG. 1.

During production of a substantial number of valve assemblies 100, a desired preload force can be obtained in the primary spring 142 in a majority of the valve assemblies. However, due to manufacturing tolerances and other causes, a desired preload is not obtained in the primary springs 142 of some of the valve assemblies. Since the spring retainer 150 is not welded to the valve member 118, the spring retainer 150 can be readily disconnected from the valve member 118 to enable the primary spring preload to be adjusted.

When the spring retainer 150 has been disconnected from the valve member 118, the number and/or axial thickness of the shims 158–162 can be adjusted to either increase or decrease the axial extent of the stack of shims. Increasing the axial extent of the stack of shims increases the extent to which the primary spring 142 is compressed. Similarly, decreasing the axial extent of the stack of shims decreases the extent to which the primary spring 142 is compressed.

Once the axial extent of the stack of shims 158–162 has been adjusted, the spring retainer 150 can again than be threaded onto the valve member 118. The spring retainer 150 is then tightened with a predetermined torque which results in the transmission of a predetermined clamping force between the force transmitting surface 182 on the spring retainer 150 and the reference surface 184 on the valve member 118. The preload in the spring 182 can then be checked to be certain that the desired preload force is transmitted between the primary spring 142 and the valve member 118. By adjusting the axial extent of the stack of shims 158–162, the desired preload force can be obtained in all of the valve assemblies 100 during production of a substantial number of valve assemblies. This minimizes scrap and therefore tends to reduce the cost of producing the valve assemblies.

From the above description of the invention, those skilled in the art will perceive improvements, changes and modifications. Such improvements, changes and modifications within the skill of the art are intended to be covered by the appended claims.

Having described the invention, the following is claimed:

1. A valve assembly comprising:
    a valve member having a valve stem extending from a head end portion of said valve member, said valve stem having reference surface and a valve stem thread convolution;
    a valve seat disposed in engagement with said head end portion of said valve member;
    a primary spring which extends along said valve stem; and
    a spring retainer having a spring retainer thread convolution which engages said valve stem thread convolution on said valve stem, said primary spring being compressed between said valve seat and said spring retainer to provide a primary spring preload force which presses said valve seat against said head end portion of said valve member,
    said spring retainer thread convolution on said spring retainer and said valve stem thread convolution on said valve stem transmit force to press a force transmitting surface on said spring retainer against said reference surface on said valve stem with a retainer preload force which is at least as great as said primary spring preload force;
    a circular damping disk disposed between said primary spring and said spring retainer, said damping disk having a circular outer side surface which cooperates with a housing to dampen movement of said valve member relative to the housing, and a plurality of circular shims disposed between said primary spring and said damping disk, each of said shims having a circular outer side surface with a diameter which is less than a diameter of said circular outer side surface of said damping disk.

2. A valve assembly as set forth in claim 1 wherein said reference surface has an annular configuration and is disposed in a coaxial relationship with said valve stem thread convolution on said valve stem, said force transmitting surface on said spring retainer having an annular configuration and being disposed in a coaxial relationship with said spring retainer thread convolution on said spring retainer, said force transmitting surface on said spring retainer being pressed against and rotated relative to said reference surface on said valve member upon rotation of said spring retainer thread convolution on said spring retainer relative to said valve stem thread convolution on said valve stem.

* * * * *